US006677593B1

(12) United States Patent
Van Berkel

(10) Patent No.: US 6,677,593 B1

(45) Date of Patent: Jan. 13, 2004

(54) PLANAR FLOW-BY ELECTRODE CAPACITIVE ELECTROSPRAY ION SOURCE

(75) Inventor: Gary J. Van Berkel, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/229,657

(22) Filed: Aug. 28, 2002

(51) Int. Cl.[7] .................................. B01D 17/06

(52) U.S. Cl. .................................. 250/423 R; 250/492.3; 250/281; 250/282; 204/180.1; 204/601; 204/451; 436/172; 436/177; 436/180

(58) Field of Search .................................. 250/423 R, 492.3, 250/493.1, 281, 282, 284, 287, 288; 204/180.1, 601, 451; 436/172, 180, 177

(56) References Cited

U.S. PATENT DOCUMENTS

| | | | | |
|---|---|---|---|---|
| 5,196,115 A | | 3/1993 | Andelman | |
| 5,415,768 A | | 5/1995 | Andelman | |
| 5,538,611 A | | 7/1996 | Otowa | |
| 5,547,581 A | | 8/1996 | Andelman | |
| 5,716,852 A | * | 2/1998 | Yager et al. | 436/172 |
| 5,869,832 A | | 2/1999 | Wang et al. | |
| 6,107,626 A | | 8/2000 | Wang et al. | |

OTHER PUBLICATIONS

Kebarle, P. "A Brief Overview of the Present Status of the Mechanisms Involved in Electrospray Mass Spectometry" Journal of Mass Spectrometry, J. Mass Spectrom, 35, (2000), pp. 804–817.

Kostiainen, et al. "Effect of Multiple Sprayers on Dynamic Range and Flow Rate Limitations in Electrospray and Ionspray Mass Spectrometry" Rapid Communications in Mass Spectrometry, vol. 8 (1994), pp. 549–558.

Rohner, et al. "Polymer Microspray with an Integrated Thick–Film Microelectrode" Anal. Chem. 73, (2001), pp. 5353–5357.

Myers, M.N. "Overview of Field–Flow Fractionation" Journal Microcolumn Separations, 9(3), (1997), pp. 151–162.

Caldwell, K.D. "Electrical Field–Flow Fractionation" Field-Flow Fractionation Handbook, Wiley–Interscience, Chapter 19, pp. 295–312.

Tri, et al. "Development of Electrical Field–Flow Fractionation" Anal. Chem. 72, (2000), pp. 1823–1829.

Fuh, C.B. "Split–Flow Thin Fractionation" Analytical Chemistry, 2000, pp. 266A–271A.

Fuh, et al. "Isoelectric Split–Flow Thin (SPLITT) Fractionation of Proteins" Separation Science and Technology, 32(18), (1997), pp. 2945–2967.

Fuh, et al. "Hydrodynamic Characterization of SPLITT Fractionation Cells" Separation Science and Technology, 30(20) (1995), pp. 3861–3876.

Giddings, J.C. "A System Based on Split–Flow Lateral-Transport Thin (SPLITT) Separation Cells for Rapid and Continuous Particle Fractionation" Separation Science and Technology, 20(9 & 10) (1985), pp. 749–768.

* cited by examiner

*Primary Examiner*—John R. Lee
*Assistant Examiner*—David A. Vanore
(74) *Attorney, Agent, or Firm*—Akerman Senterfitt

(57) ABSTRACT

An electrospray ion source includes a chamber including a channel region therein, the channel including at least one inlet for directing a solution into the channel and at least a first and a second outlet for transmitting the solution or derivatives therefrom out from channel. Structure for separating ions in the solution is provided from separating the solution into at least a first and a second flow stream portion. The first flow stream portion is enriched in negative ions and the second flow stream portion is enriched in positive ions. The first flow stream portion is adapted to exit the chamber through the first outlet while the second flow stream portion is adapted to exit the chamber through the second outlet. A method of charge separation can include the step of simultaneously providing at least two gas phase ion stream portions having opposite polarity.

14 Claims, 4 Drawing Sheets

PLANAR FLOW-BY ELECTRODE CAPACITIVE ELECTROSPRAY ION SOURCE

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not applicable.

FIELD OF THE INVENTION

This invention relates generally to electrospray devices, and more particularly to an improved electrospray ion source assembly.

BACKGROUND OF THE INVENTION

Electrospray (ES) is a method of producing highly charged droplets and gas phase ions. A particularly useful application for electrospray is the production of gas phase ions from analytes in liquid solutions delivered by methods such as high pressure liquid chromatography, capillary electrophoresis or capillary electrochromatography to a system for detection and analysis, such as a mass spectrometer (MS).

The electrospray process generally includes flowing an analyte liquid into an electrospray ion source comprising a small tube or capillary which is maintained at a high voltage in absolute value terms, with respect to a nearby surface. The small tube or capillary functions as an emitter electrode. In a typical ES-MS system, a solution containing analytes of interest is pumped through the emitter electrode and sprayed towards the remotely located orifice plate of the mass spectrometer. In this arrangement, the orifice plate functions as the counter electrode.

Under the influence of the electric field between the emitter electrode and the orifice plate, ions in solution that are of the same polarity as the voltage applied to the ES capillary buildup an excess charge at the surface of the liquid exiting the emitter until a point is reached where the Coulombic forces are sufficient to overcome the surface tension of the liquid. At this point, droplets enriched in ions of this polarity are emitted from the capillary and drift toward the counter electrode. This process produces a quasi-continuous steady-state electrical current.

The inability to completely separate positive ions from negative ions in solution is the fundamental limit to generation of the maximum gas-phase ion production during ES ionization. Ideally, complete separation of positive and negative ions would produce maximum gas-phase ion production. However, conventional ES ion sources provide charge separation of no better than about 50% (1).

SUMMARY OF INVENTION

An electrospray ion source includes a chamber which provides a channel region therein, the channel including at least one inlet for directing a solution into the channel and at least a first and a second outlet for transmitting the solution or derivatives therefrom out from the channel. A structure for separating ions in the solution separates the solution into at least a first and a second flow stream portion. The first flow stream portion is enriched in negative ions and the second flow stream portion is enriched in positive ions. The first flow stream portion exits the chamber through the first outlet while the second flow stream portion exits the chamber through the second outlet. Accordingly, the invention can be used to simultaneously generate gas phase ions of opposite polarity from a given sample.

The structure for separating ions can include a device for generating an electrical field in the channel. The electrical field is preferably oriented in a direction substantially orthogonal to a flow direction of the solution in the channel. The device for generating an electrical field can comprise at least one capacitor, the capacitor including at least two electrodes, the electrodes positioned on substantially opposite sides of the channel. The structure for separating ions can be adapted to provide a time varying electromagnetic field in the channel.

The structure for separating ions can comprise a device for generating a magnetic field in the channel. The device for generating a magnetic field can be an electromagnet.

The electrospray source can be microfabricated, such as on a chip. In this embodiment, the channel includes at least a first and second integrated electrode.

An electrospray system can include a plurality of the electrospray ion sources of claim 1. In this embodiment, at least two of the plurality of electrospray ion sources are connected in series. This arrangement can be used to further increase charge separation efficiency, if desired.

An electrospray method for generating at least one charged fluid includes the steps of providing an electrospray ion source, the electrospray ion source including at least one input and at least a first output and a second output. Fluid is flowed through the input into the electrospray ion source. The fluid is then separated into a positively charged fluid stream portion and a negatively charged fluid stream portion, wherein the positively charged fluid stream portion is emitted from the first output and the negatively charged fluid stream portion is emitted from the second output. The separating step can include applying at least one electromagnetic field to the fluid in the electrospray ion source. The electromagnetic field can be a time varying electromagnetic field.

The electromagnetic field can be generated between the plates of a capacitor. The method can simultaneously provide at least two gas phase ion stream portions having opposite polarity, a first polarity emitted from the first output and the other polarity emitted from the second output.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

An electrospray (ES) ion source can generate negatively and positively charged gas phase ion plumes from a given sample with an achievable charge separation that can approach 100%. As a result, higher ionization efficiencies can be obtained as compared to conventional ES devices. This feature can permit enhanced detection levels for applications such as ES-MS. The invention can also be used as an ion source for other applications, such as for the generation of gas-phase ions for ion mobility spectrometry.

The electrospray source can be used to simultaneously provide one or both of the plumes produced for analysis. In addition, ES devices according to the invention can generate charged spray plumes without the need for the high voltage electrode required by conventional ES systems.

In one embodiment of the invention, an electrospray source includes a chamber including a channel region therein, the channel including at least one inlet for directing a solution into the channel and at least a first and a second outlet for transmitting the solution or derivatives therefrom out from channel. Structure for separating ions is provided for separating the solution into separate flow stream portions including at least a first and a second flow stream portion, wherein the first flow stream portion is enriched in negative ions and the second flow stream portion is enriched in positive ions. The first flow stream portion can exit the chamber through the first outlet while the second flow stream portion can exit the chamber through the second outlet.

The structure for separating ions can comprise at least one device for generating an electrical or a magnetic field in the channel. Electrical and magnetic fields may also be used together. In the electrical field embodiment, the device for generating an electrical field is preferably capable of generating an electrical field having an orientation which is substantially orthogonal to a flow direction of the solution in the flow channel. For example, a potential difference applied across the plates of a capacitor can be used to generate the electrical field.

Using the electrical field generated between the plates of a charged capacitor, the electrospray source can separate ions in a liquid solution passing through its electrical field into two separate stream portions of liquid. One flow stream portion can be enriched in cations while the other flow stream portion can be enriched in anions. The charged solutions can exit the device through channels that are positioned opposite suitably biased electrodes. As the respective solutions exit the channels they each generate a charged droplet spray plume having the same polarity as that of the excess ions in the respective flow stream portions. The charged droplets produced give rise to gas-phase ions and these ions can be transported to the inlet region of another device, such as a mass spectrometer, for analysis.

Figure 1:
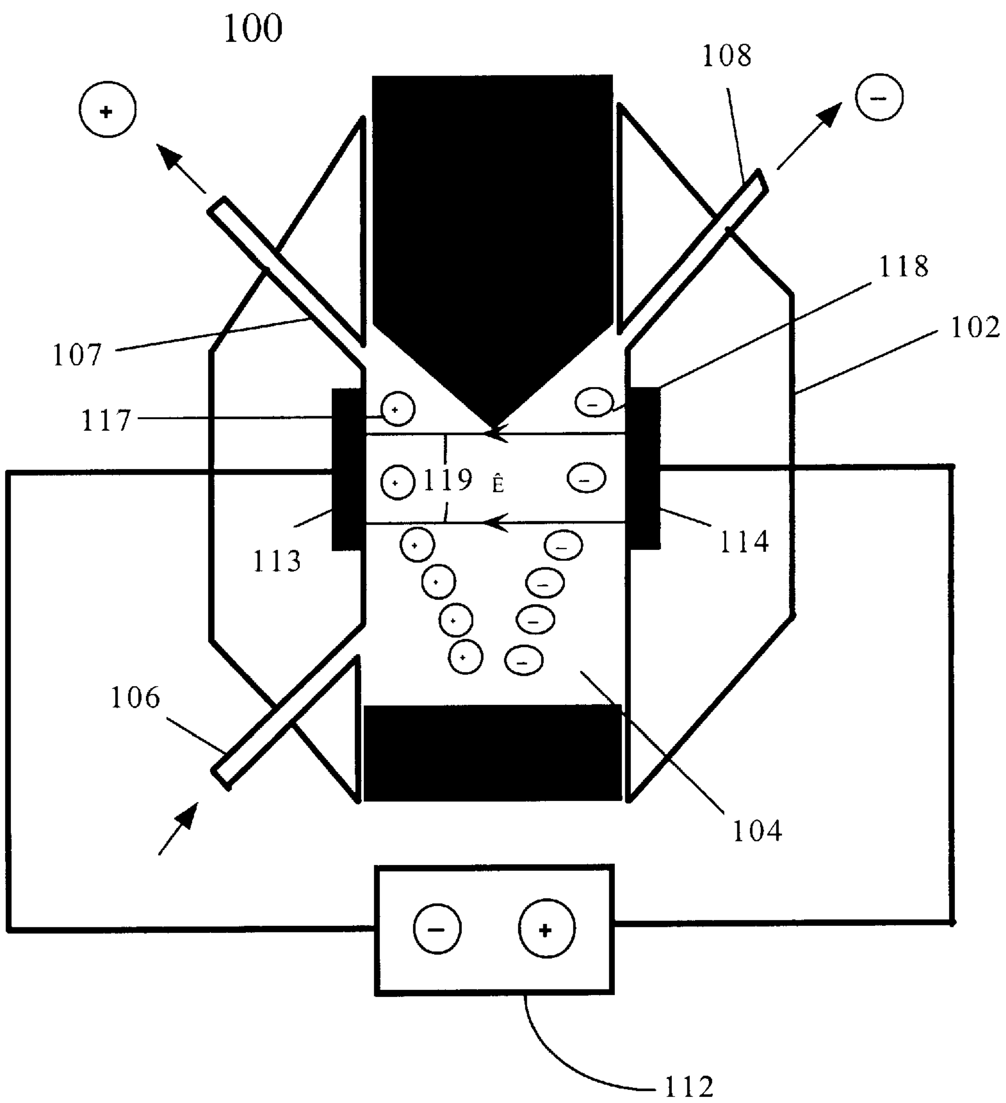
FIG. 1 illustrates an electrospray device for providing ion separation using an electrical field, according to an embodiment of the invention.

FIG. 1 illustrates an electrospray ion source 100 according to a first embodiment of the invention. Electrospray ion source 100 includes a chamber 102 which provides a channel region 104 therein. The channel 104 includes at least one inlet 106 for directing a solution into the channel 104 and at least a first 107 and a second outlet 108 for transmitting the solution or derivatives therefrom out from the chamber 102.

FIG. 1 shows an analyte solution entering chamber 102 into channel 104, the solution having both positive and negative ions therein. As with conventional electrospray sources, the analyte solution supplied to the system generally includes both positive and negative ions. However, the number of positive and negative ions are substantially equal so that overall the solution entering chamber 102 is substantially charge neutral.

A structure for separating ions, such as from a solution containing one or more analytes of interest, can include a power supply (e.g. battery) 112 connected to a capacitor comprising electrically conductive plates 113 and 114. Upon application of a potential difference between plates 113 and 114, the electrical field generated in the channel separates the ions in solution which were substantially charged balanced prior to entering the electrical field into at least a first flow stream portion 117 and a second flow stream portion 118, each having a net electrical charge, as the solution travels down the length of the channel 104 under the influence of the electrical field imposed therein.

Plates 113 and 114 can be electrically connected to or electrically isolated from the solution. For example, in the electrically isolated case, plates 113 and 114 can include a membrane or other dielectric material (not shown) disposed on the electrode plate faces which would otherwise be exposed to the solution. The solution itself between the plates 113 and 114 is already generally a weak dielectric. Addition of a dielectric covering on the face of plates 113 and 114 can increase the capacitance and prevent electrochemical reactions from occurring at the plates. Since electrochemical reactions at the plates can be prevented in this arrangement, higher plate voltages with correspondingly higher electrical fields in channel 104 can be used.

A molecular weight cutoff membrane (not shown) can also be used in channel 104. Such a membrane can be used to divide the channel, the membrane only passing species of a certain weight/size. This arrangement permits selective charge separation. For example, relatively small negative ions can be separated from cations and larger anions in a first stage. A second stage without such a membrane could then be used to separate the remaining anions from the cations.

Biased as shown in FIG. 1 by battery 112, the charged parallel plate capacitor generates electrical field ($\vec{E}$) lines 119 which are directed from plate 114 towards plate 113. The magnitude of the electrical field is nearly proportional to the applied potential difference as the plate arrangement shown essentially functions as a parallel plate capacitor. The applied voltage and resulting electrical field is generally set as high as possible without causing electrochemical reactions at the electrodes 113 and 114 to occur to avoid current flowing beyond the initial charging of the capacitor. For example, for a plate spacing distance of about 100 :m and an applied potential difference of 1 volt or less may be used.

Given the orientation and polarity applied to electrodes 113 and 114, the electrical field generated is oriented substantially orthogonal to the length of channel 104 and forces negative and positive ions apart in the flowing liquid. As a result, the first flow stream portion 117 is enriched in positive ions and the second fluid stream portion 118 is enriched in negative ions. The first flow stream portion 117 exits the chamber through the first outlet 107 while the second flow stream portion 118 exits the chamber through the second outlet 108. Outlets 107 and 108 are positioned at the opposite end of the channel 104 relative to the inlet 106 of channel 104.

The channel can generally be a few microns to a few tens of microns high with a width of 1 cm or less. In the embodiment where the structure for separating ions comprises a capacitor, narrower channel width and larger electrode area increases capacitance. The channel length can be about 1 cm to several centimeters. The above channel dimensions are only provided as an example. Optimum channel dimensions for a given application can be determined through routine experimentation.

In contrast to electrospray ion source 100, conventional ES sources generate only a single polarity of ions in solution and require a high voltage "working" electrode. In these systems, ions are generated by electrochemically changing the solution charge balance at the working electrode by adding more of one ion polarity or discharging the other ion polarity, or both of these charge exchange processes. As a result, an excess of one ion polarity is obtained creating the conditions necessary to form charged droplets. In these conventional ES devices, the working electrode is generally connected to a high voltage supply and is operated as a high voltage electrode, such as at several thousand volts. In these systems, the counter electrode is the second electrode in the two electrode system, the counter electrode generally held at or near a ground potential. This process can be considered to involve seeding the charge separation process as well as one or more electrochemical processes. The electrochemistry provides a continuous supply of an excess of one ion polarity into the charged droplets.

A high voltage working electrode is not shown in FIG. 1 since the invention generally does not require a working electrode. Rather than using a working electrode for charge separation, the electrical field generated between the biased capacitor plates 113 and 114 separates the positive from the negative charges in the solution. Negatively charged stream portion 118 carries a net negative charge of about the same absolute magnitude as positively charged stream portion 117.

As noted above, bias levels of the electrodes 113 and 114 are generally held below about 1 volt, so that electrochemistry preferably does not occur at either electrode. Higher bias levels can begin to nominally discharge the capacitor which can initiate neutralizing certain analyte solutions, thus reducing the charge separation otherwise obtainable from electrospray source 100.

The potential difference applied to the electrode plates 113 and 114 is preferably not a steady state DC voltage as a steady state voltage would not generally provide the desired trajectory of the respective fluid streams toward outlets 107 and 108. An alternating waveform, such as a square wave or a triangular wave, for example, can permit ions concentrated between the two electrodes 113 and 114 to move freely in the solution during time intervals that the potential difference between the electrodes are reduced to a sufficiently low level, such as zero. For example, plates 113 and 114 may be short circuiting to one another during one or more discrete periods during the time required for the solution to pass the channel length between plates 113 and 114 to achieve the desired trajectory of the respective fluid stream portions toward outlets 107 and 108.

Thus, selection of the proper balance among the solution flow rate, channel width, channel length, nominal potential applied and the rate of charging/short circuiting of the electrodes allows different ion polarities to be separated from one another as the solution passes though channel 104. These parameters can be determined by routine experimentation. It may also be possible to employ an optional feedback and control system (not shown), where operating parameters may be modified automatically, such as the solution flow rate or electrode biasing, to optimize the output of a given desired parameter. For example, charge separation efficiency can be monitored and optimized in this manner.

As the respective solutions exit channels 107 and 108 they each generate a charged droplet spray plume of the same polarity as that of the excess ions in the respective solutions. The charged droplets produced give rise to gas-phase ions and these ions can be transported to the inlet region of another device, such as a mass spectrometer (not shown), for analysis.

Without a high voltage electrode, system 100 propels the respective ion streams toward the respective counter electrodes for receiving the negative and positive ions, respectively because each both the ions and the counter electrode are charged. Assuming an ES-MS system where the orifice plate (counter electrode) of the mass spectrometer is grounded, the solution exiting either channel would see a lower potential because each is charged. For ions to continue through the orifice and through the mass spectrometer the lens on the mass spectrometer side would be negative with respect to the orifice for the positive ions to pass and positive for the negative ions to pass.

In certain applications, electrodes 113 and 114 can also be floated. The floating voltage can be limited to some selected range appropriate to drive the ions in the direction towards an intended target, such as a mass spectrometer. Again, the voltage levels used preferably do not result in electrochemistry occurring at either of the electrodes 113 and 114.

Figure 2:
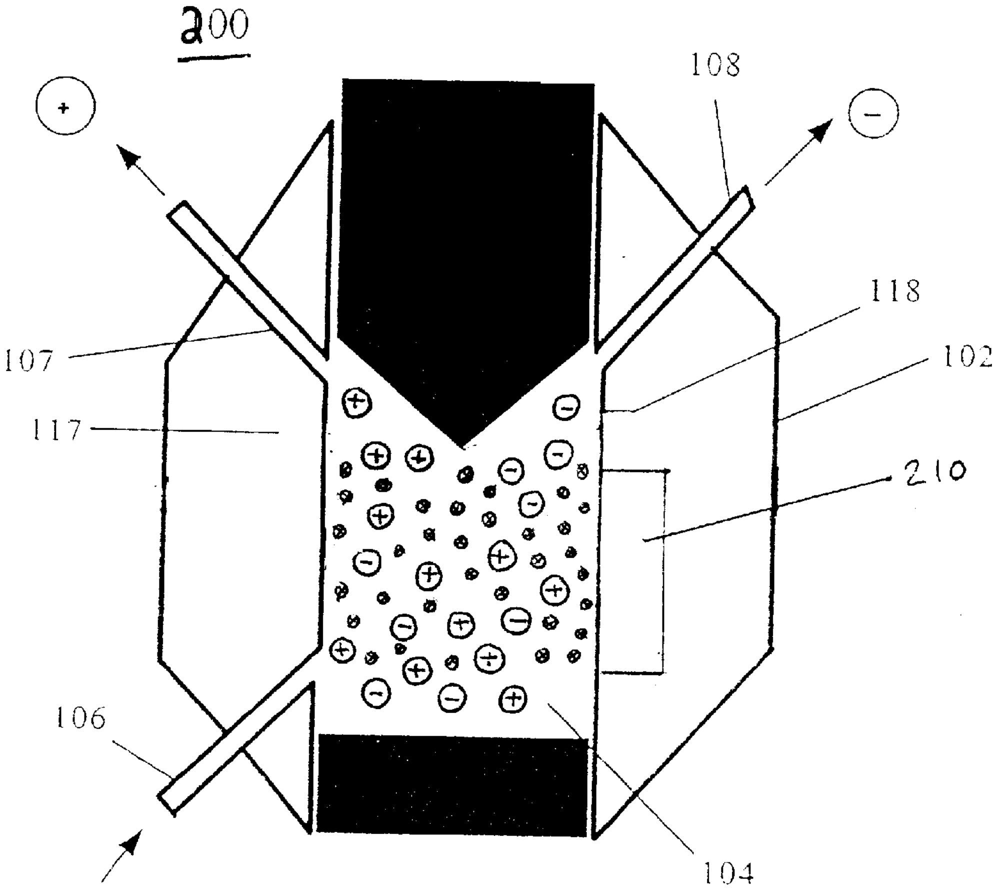
FIG. 2 illustrates an embodiment of electrospray device that uses a magnetic field to separate positive (+) and negative (−) ions, according to another embodiment of the invention.

A magnetic field can be used as an alternative to an electrical field to separate ions in solution into a positively charged and a negatively charged stream. Electrical and magnetic fields may also be combined for this purpose. As shown in FIG. 2, electrospray device 200 includes a device for generating a magnetic field 210 used to generate a $\vec{B}$ field pointing in or out of the page direct one polarity of ions to the left and ions of the other polarity to the right of FIG. 2. A substantially uniform $\vec{B}$ field represented by encircled x's is shown in FIG. 2, which represent a $\vec{B}$ oriented into the page. This magnetic field orientation forces the positively charged ions to the left and negatively charged ions to the right of FIG. 2. One or more fixed magnets can be used for this purpose. Alternatively, an electromagnet can be provided for applications where it is desired to turn the $\vec{B}$ field on and off.

Although FIG. 1 shows one exit on either side of the channel 104, alternate configurations having additional outputs can be used. For example, channel exits can be provided along each side of the length of the channel 104, such as some defined length interval. The channels could each generate a stream of charged solution but each might be enriched in a different distribution of positive ions in the one case and on the other side different distributions of negative ions. This might be useful to obtain a concentration effect for the analytes or to selectively remove a particularly detrimental matrix component in the sample. Electric field driven field flow fractionation devices work in essentially the same manner.

Figure 3:
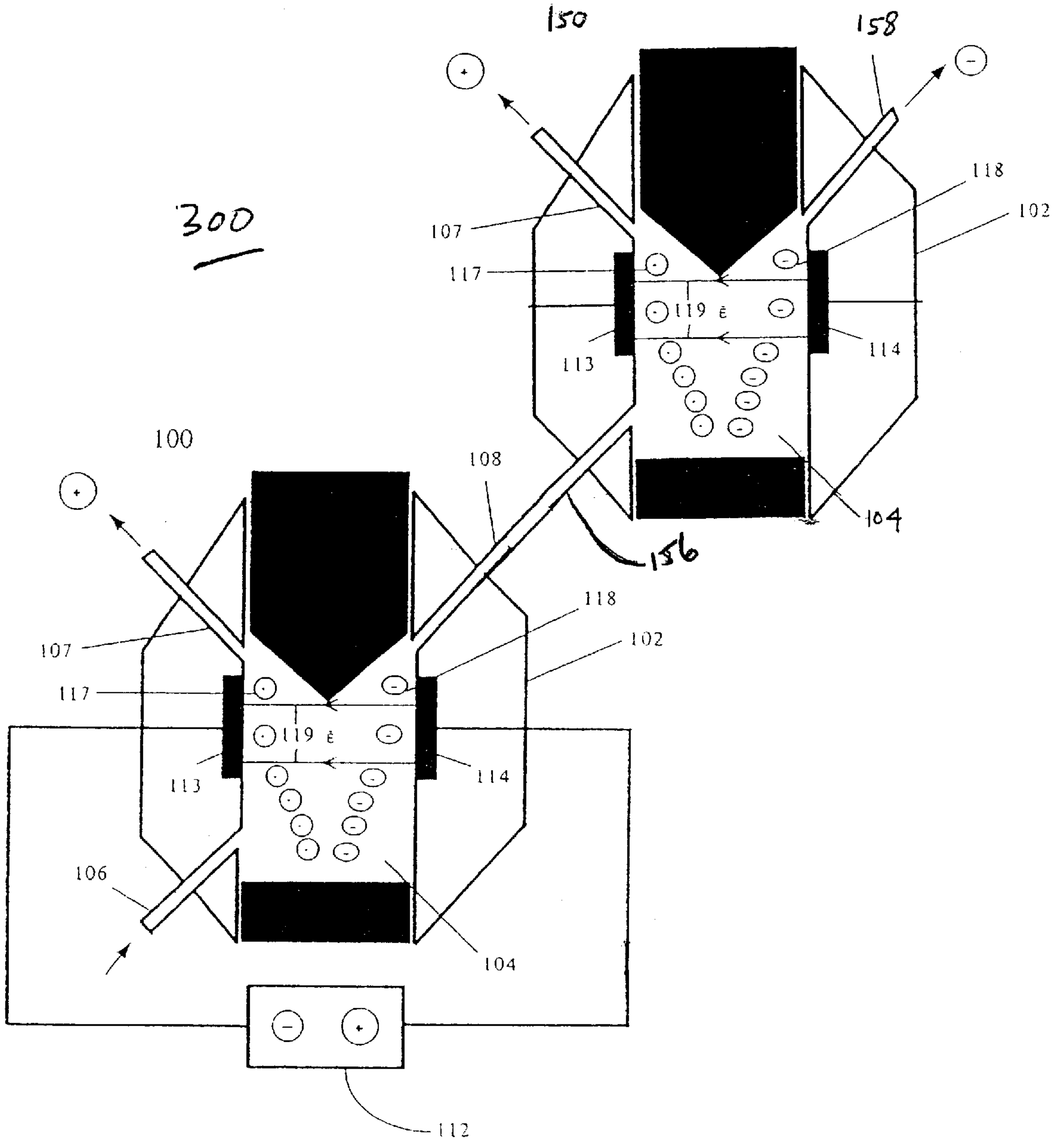
FIG. 3 shows an electrospray device comprising two electrospray devices connected in series, according to another embodiment of the invention.

More than one ES device according the invention can be positioned in series. In a series arrangement, the output of a first device is used as the input of the second device. This can be used to further increase the obtainable degree of charge separation. An embodiment of the invention showing an electrospray device 300 comprising two ES devices 100 connected in series is shown in FIG. 3. In the arrangement depicted the exit channel 108 of the ES device 100 carrying a flow enhanced in positive ion content is fluidly connected to the input channel 156 of a second ES device 150. The second change separation provided by device 150 results in further separation and concentration of ions which already have enhanced negative ion content based on separation provided by device 100, with negative ions shown in FIG. 3 being released from the exit channel 158 of the device 150.

Figure 4:
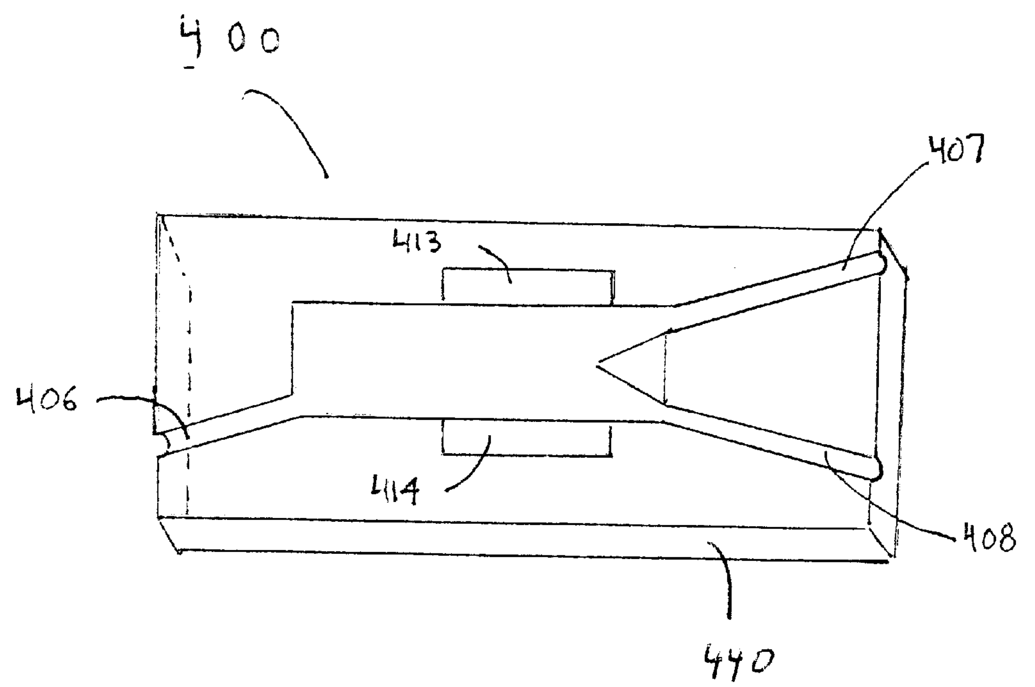
FIG. 4 is a schematic top perspective view of an electrospray device of the invention fabricated on a microchip, according to yet another embodiment of the invention.

The invention can be embodied as a chip-based microfabricated device. For example, Rohner et al (2) discloses microfabricated channels having integrated electrodes which can be modified to form electrospray ion sources according to the invention. FIG. 4 shows an embodiment of an ES device according to the invention 400 configured on a microchip substrate 440. Device 400 includes inlet 406, electrodes 413 and 414, and first and second outlets 407 and 408, respectively. Implementations of the invention using a plurality of ES devices, such as two or more microfabricated devices having integrated electrodes in the channels connected in series are facilitated using this embodiment, and as noted above, may provide enhanced efficiency. In addition, if embodied as a microfabricated device 400, supporting electronic circuitry, such as a power supply circuit (not shown) and a controller (not shown) can be provided on chip.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The following literature citations as well as those cited above are incorporated by reference herein for the reasons cited in the above text:

1. Kostianinen, R.; Bruins, A. P. "Effect of Multiple Sprayers on the Dynamic Range and Flow Rate Limitations in Electrospray and Ionspray Mass Spectrometry." *Rapid Comm. Mass Spectrom.* 1994, 8, 549–558.
2. Rohner, T. C.; Rossier, J. S.; Girault, H. H. "Polymer Microspray with an Integrated Thick-Film Microelectrode." *Anal. Chem.* 2001, 73, 5353–5357.

I claim:

1. An electrospray ion source, comprising:

a chamber including a channel region therein, said channel including at least one inlet for directing a solution into said channel and at least a first and a second outlet for transmitting said solution or derivatives therefrom out from channel, and structure for separating ions in said solution into separate flow stream portions including at least a first and a second flow stream portion, wherein said first flow stream portion is enriched in negative ions and said second flow stream portion is enriched in positive ions, said first flow stream portion adapted to exit said chamber through said first outlet while said second flow stream portion exits said chamber through said second outlet.

2. The electrospray source of claim 1, wherein said structure for separating ions comprises a device for generating an electrical field in said channel.

3. The electrospray source of claim 2, wherein said electrical field is oriented in a direction substantially orthogonal to a flow direction of said solution in said channel.

4. The electrospray source of claim 2, wherein said device for generating an electrical field comprises at least one capacitor, said capacitor including at least two electrodes, said electrodes positioned on substantially opposite sides of said channel.

5. The electrospray source of claim 1, wherein said structure for separating is adapted to provide a time varying electromagnetic field in said channel.

6. The electrospray source of claim 1, wherein said structure for separating ions comprises a device for generating a magnetic field in said channel.

7. The electrospray source of claim 1, wherein said device for generating a magnetic field comprises an electromagnet.

8. The electrospray source of claim 1, wherein said electrospray source is microfabricated, wherein said channel includes at least a first and second integrated electrode.

9. An electrospray system, comprising a plurality of said electrospray ion sources of claim 1, wherein at least two of said plurality of electrospray ion sources are connected in series.

10. An electrospray method for generating at least one charged fluid, comprising the steps of:

providing an electrospray ion source, said electrospray ion source including at least one input and at least a first output and a second output;

flowing a fluid through said input into said electrospray ion source, and separating said fluid into a positively charged fluid stream portion and a negatively charged fluid stream portion, wherein said positively charged fluid stream portion is emitted from said first output and said negatively charged fluid stream portion is emitted from said second output.

11. The method of claim 10, wherein said separating step includes applying at least one electromagnetic field to said fluid in said electrospray ion source.

12. The method of claim 11, wherein said electromagnetic field is a time varying electromagnetic field.

13. The method of claim 11, wherein said electromagnetic field is generated between the plates of a capacitor.

14. The method of claim 10, further comprising the step of simultaneously providing at least two gas phase ion stream portions having opposite polarity, a first polarity emitted from said first output and the other polarity emitted from said second output.

* * * * *